July 30, 1957  R. KUPER  2,800,992
MASONRY UNIT TILTING MACHINE
Filed Nov. 22, 1954  3 Sheets-Sheet 1

INVENTOR.
Rudolph Kuper
BY
Attorney

July 30, 1957 R. KUPER 2,800,992
MASONRY UNIT TILTING MACHINE
Filed Nov. 22, 1954 3 Sheets-Sheet 2

INVENTOR.
Rudolph Kuper
BY
Attorney

July 30, 1957 — R. KUPER — 2,800,992
MASONRY UNIT TILTING MACHINE
Filed Nov. 22, 1954 — 3 Sheets-Sheet 3
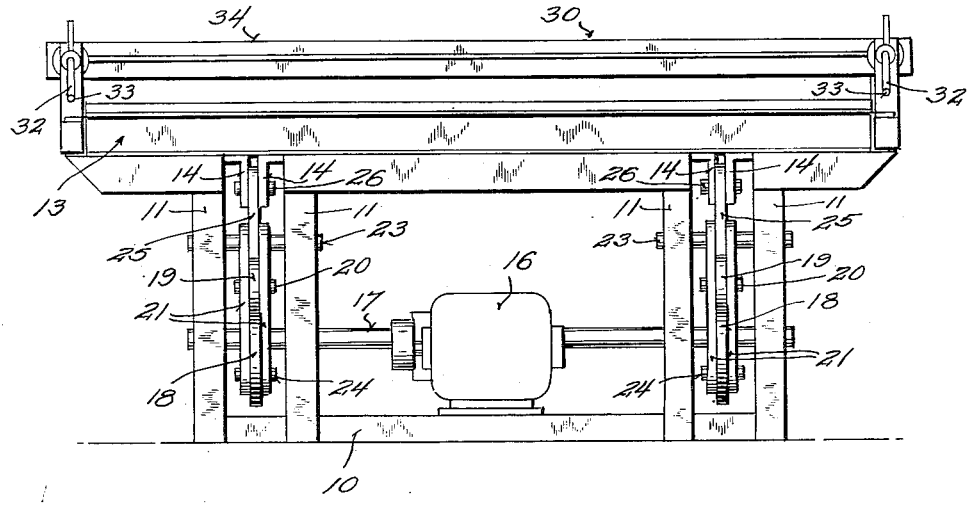
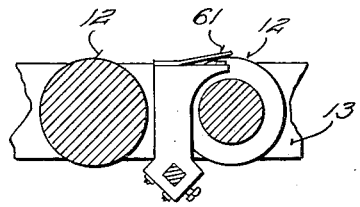
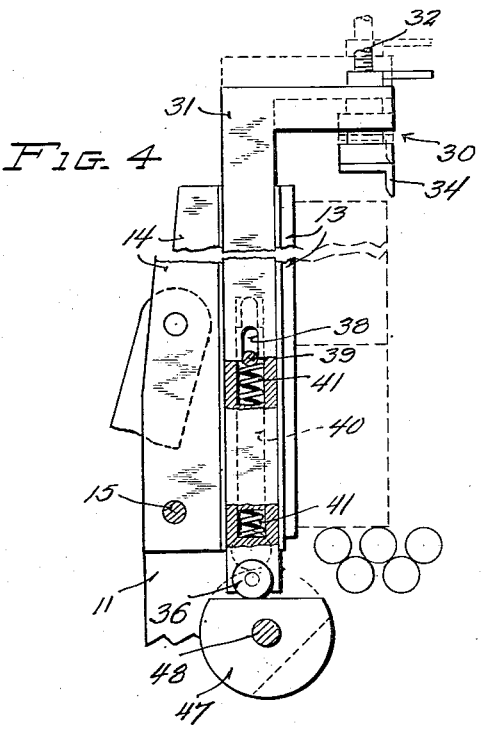
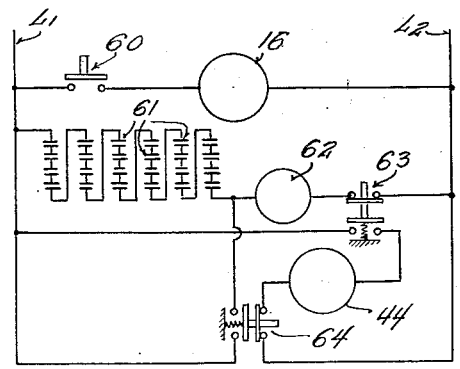
INVENTOR.
Rudolph Kuper
BY
Attorney United States Patent Office 2,800,992
Patented July 30, 1957

2,800,992

MASONRY UNIT TILTING MACHINE

Rudolph Kuper, Fox Point, Wis.

Application November 22, 1954, Serial No. 470,265

3 Claims. (Cl. 198—33)

This invention relates to a tilting machine for use in conjunction with the production and handling of masonry units such as concrete, cincrete, lightweight, slag and other forms of building blocks.

In the normal process of manufacture, masonry units contain air passages which are disposed in vertical position to facilitate the forming of each unit. After the units have been formed they are transported on a conveyor to a station from which they are removed for the purpose of curing and stacking or cubing.

In order to facilitate the stacking or cubing of the units for curing or storage purposes, it is desirable to have the units positioned in a manner so that the air passages lie in a horizontal position. In the past, to the best of my knowledge, the desired alteration of the position of the individual units has been effected by means of laborious, time-consuming and expensive manual handling.

The primary object of the present invention resides in the provision of a machine for effecting the tilting of a masonry unit or block during the course of its manufacture to facilitate its subsequent handling.

Another object of the invention resides in the provision of a new and improved machine for effecting the tilting of masonry units during the course of their manufacture by means of the rockable movement of a portion of the machine including a unit carrying conveyor to effect the transfer of the support of the unit from one of its surfaces to another whereby the air passages in each unit are disposed in a horizontal rather than a vertical plane.

Another object of the invention resides in the provision of a new and improved machine for effecting the tilting of masonry units during the course of their production to effect the transfer of the units from one portion of the machine to another and in so doing alter the arrangement of the units from a plurality of rows of units to a tier of units wherein the air passages in each unit are transferred from a vertical to a horizontal position to facilitate the subsequent handling of the unit.

Another object of the invention resides in the provision of control means responsive to the presence of a predetermined number of masonry units disposed on the tiltable portion of the machine for initiating and controlling the automatic operation of the unit tilting mechanism.

Another object of the invention resides in the provision of stop means on the tiltable portion of the machine for effecting the proper positioning of substantially parallel rows of units upon the tiltable portion of the machine.

Another object of the invention resides in the provision of gripping means operative in response to the tilting movement of a portion of the machine to engage the masonry units to preclude the accidental displacement of the same during their transfer from a series of rows supported on one portion of the machine to a tier arrangement supported on another portion of the machine.

Other objects and advantages will become apparent from the following description of an illustrative embodiment of the present invention.

In the drawings:

Fig. 3 is a side elevational view of the machine illustrating the actuating means for effecting the rocking movement of the unit supporting conveyor frame;

Fig. 4 is an enlarged detailed view showing a means for effecting the automatic gripping action upon the masonry units during their tilting movement;

Figure 1:
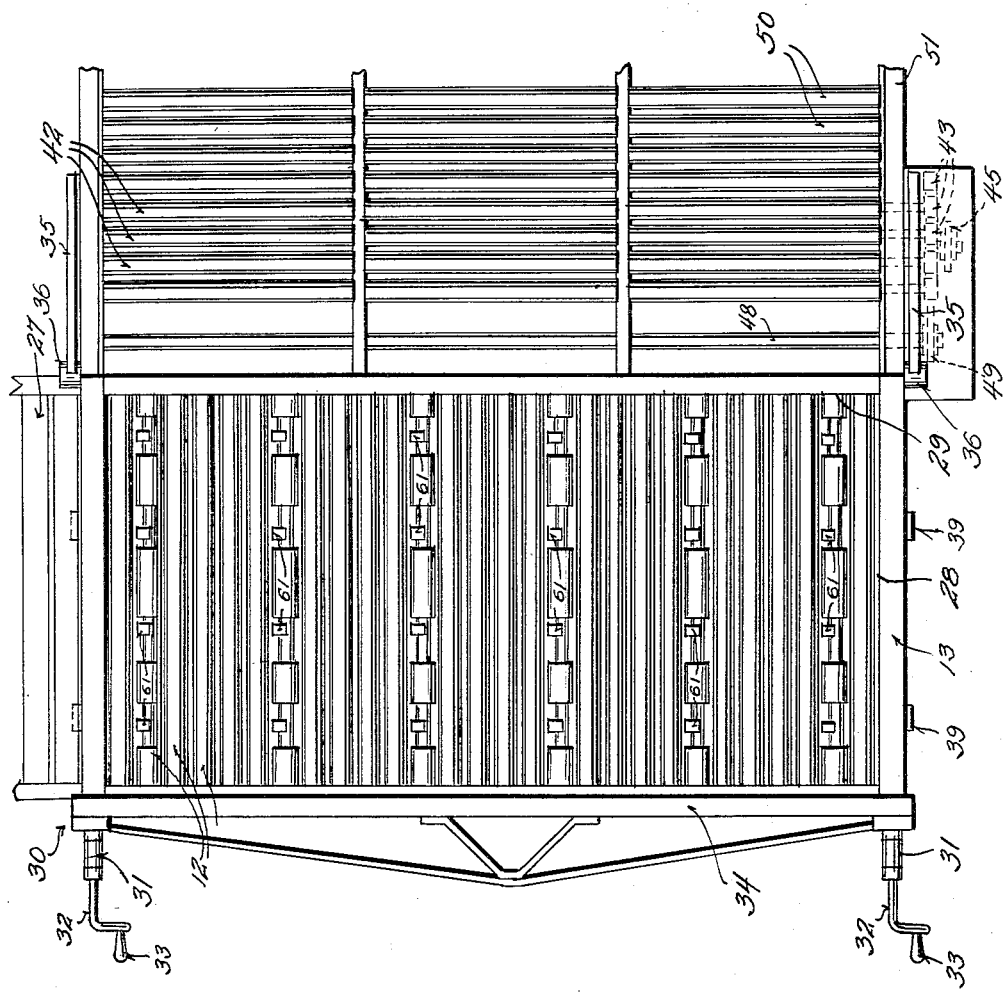
Figure 1 is a top plan view of a masonry unit tilting machine constructed in accordance with the teachings of the present invention.

Fig. 5 is an enlarged detailed view of one of the control means responsive to the presence of a masonry unit for effecting the automatic operation of the tilting mechanism; and Fig. 6 is a schematic electrical diagram illustrating a means whereby the automatic actuation of the tilting mechanism is effected only upon the presence of a predetermined number of masonry units on the rockable portion of the machine.

The machine chosen for illustrative purposes in the accompanying drawings and embodying the teachings of the present invention comprises generally a substantially rectangular base portion 10 and a plurality of upright pillars or posts 11 which form supports for the remaining portions of the machine. A plurality of parallelly arranged unit supporting rollers 12 are journalled for free rotation in a frame member 13 which includes depending flange portions 14 which are rockably supported adjacent one of their ends on a pivot pin 15 to permit the rocking action of the frame member 13 from a normally horizonal position in which the free end of the frame member is supported by the upright pillars or posts 11 to a position wherein the frame member 13 is rocked to a vertical position (as shown in dotted lines of Fig. 2) to effect the alteration of the relative position of the masonry units from a series of substantially parallel horizontal rows to a vertically disposed tier of units.

A means for effecting the rocking movement of the frame member 13 comprises an electric motor 16 suitably anchored on the base 10 and drivingly connected through conventional clutch means (not shown) to a countershaft 17 which extends to full length of the base 10 and is journalled in suitable bearings mounted in aligned upright posts 11 disposed at opposite ends of the base 10. A pair of identical cam members 18 are secured in identical phase relationship adjacent the opposite ends of the countershaft 17. The cam surfaces of the members 18 each engage and support a cam follower roller 19 journalled for free rotation on a shaft 20 mounted intermediate the ends of a pair of laterally spaced arms 21 which in turn are journalled at one end on pins 23 mounted in the parallelly arranged upright posts 11 which provide the mounting means for the countershaft 17. A pivot pin 24 mounted adjacent the free ends of the arms 21 provides a rockable support for one end of a connecting link 25, the other end of which is rockably mounted on a pin 26 carried by the depending flanged members 14.

Figure 2:
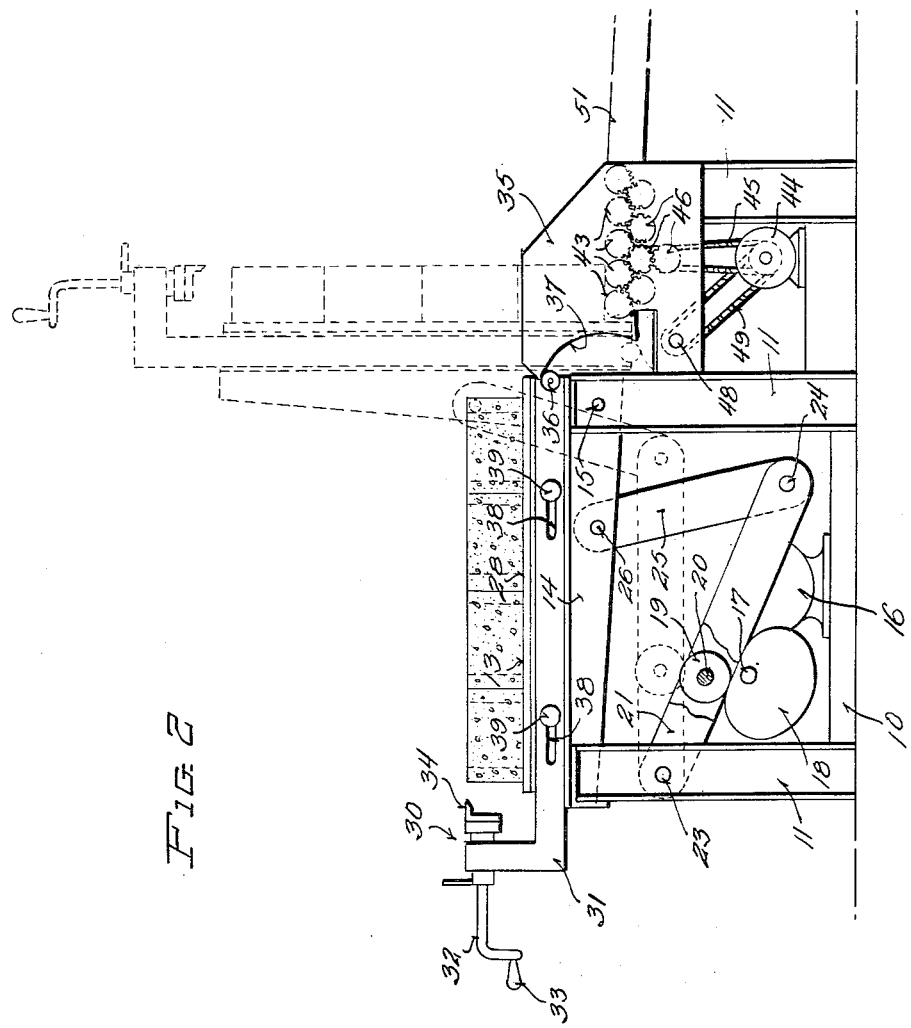
Fig. 2 is an end elevational view of the machine illustrating a means for effecting the rocking movement of a unit supporting conveyor frame and a means for driving the tier supporting conveyor rolls to effect the discharge of the units from the tilting machine.

The cyclic operation of the motor 16 is such that the frame member 13 is normally retained in the full line position shown in Fig. 2 wherein masonry units are slidably receivable in rows thereon from any suitable delivery conveyor 27 shown in Fig. 1. When the proper number of masonry units have been deposited on the rollers 12 supported in the frame member 13, control means which will hereinafter be more specifically described serve to effect the energization of the motor 16 to effect the rocking action of the frame member 13 about the pivot pin 15 to raise the free end of the frame member 13 to the position shown in dotted lines in Fig. 2 wherein the parallel rows of masonry units assume a tier formation with succeeding rows of the masonry blocks disposed one above the other. The rocking movement of the frame member 13 is effected through the action of the cam members 18 on the cam follower rollers 19 imparting the resultant movement of the arms 21 and connecting links 25 to raise the free end of the normally horizontal frame member 13 from a horizontal to a vertical position.

As the masonry blocks are fed in rows (usually four) from the delivery conveyor 27 to the rollers 12 they proceed forwardly until the leading unit of each row engages a stop in the form of an end rail 28 of the frame member 13 with the forwardmost row being disposed adjacent a side rail 29.

Stop gripping means 30 is provided for engaging the masonry units supported on the rollers 12 which form a part of the rockably mounted frame 13. The function of the gripping means 30 is to maintain the individual masonry units in proper associated relationship on the tiltable frame member 13 during the rocking movement of the same from its normally horizontal loading position wherein the masonry units are disposed in substantially parallel rows to its vertical discharge position wherein the masonry units are stacked one upon the other in tiers.

The gripping means chosen for illustrative purposes in the accompanying drawings comprises a pair of L-shaped bars 31 having their longer legs slidably receivable for longitudinal movement along the end members of the frame 13. The shorter upstanding legs of the bars 13 provide a mounting means for manually operable adjusting screws 32 which are provided at one of their ends with an actuating handle 33 and whose inner ends are connected by a cross rail 34 in the form of an angle having its horizontal projecting portion slightly tapered to provide a gripping contact with the rearward row of masonry units to urge all of the rows laterally across the frame 13 until the forward row is in contact with the side rail 29 of the frame and the remaining rows are brought into surface contact with the adjacent rows. The position of the cross rail 34 may be manually adjusted toward and from the short legs of the bars 31 by manual manipulation of the actuating handles 33 to initially position the cross rail adjacent the outer row of the masonry units. The gripping action of the cross rail 34 against the rows of blocks is effected automatically with the rocking movement of the frame member 13. The means for effecting the automatic gripping action comprises the cooperating action between a pair of vertically disposed stationary cam plates 35 located adjacent the outer surfaces of the forward ends of the bars 31 which are each provided with a cam follower 36 which project outwardly from the bars 31 and adapted to follow a cam surface 37 formed on the forward and under side of the cam plates 35. As previously described, the longer legs of the members 31 are positioned and guided for movement in the end members of the frame 13. Each of the members 31 is provided with longitudinally extending slots 38 adapted to receive mounting and guide pins 39 which are anchored in the end members of the frame 13. The members 31 are further provided with recesses 40 adapted to house compression springs 41, the ends of which respectively react against the end wall of each recess 40 and the guide pin 39 to normally urge the gripping means 30 toward the rows of masonry units.

As the frame member 13 is rocked from its normally horizontal to a vertical position, the gripping means 30 gradually moves forward under the action of the compression springs 41 which maintain the cam followers 36 in contact with the cam surfaces 37 of the plates 35. During the upward rocking movement of the frame 13 the cam follower rollers 36 are freed from contact with the cam surfaces 37 and the compression springs 41 serve to effect the sliding movement of the unit gripping means 30 into pressure contact with the masonry units which have been assembled on the conveyor rollers 12 of the frame 13. The gripping action on the assembled masonry units persists when the tier of units are moved to a position wherein the bottom row is supported upon a series of unit supporting rollers 42 which are cyclicly driven to effect discharge movement of the tier of masonry units after the gripping means 30 has been released from clamping contact with the tier of units. A gear 43 fixedly mounted on one end of each roller shaft is periodically driven from an electric motor 44 through suitable chain and sprocket means 45 which in turn drive one of a series of gears 46 which respectively mesh with adjacently located gears 43. The motor 44 also provides a means for effecting the timed release of the gripping means 30 through the action of a pair of cams 47 mounted on a shaft 48 suitably journalled in the frame portion of the machine. The cams 47 are positioned immediately beneath the cam follower rollers 36 when the frame 13 is rocked to its vertical position. Suitable chain and sprocket connections 49 serve to transmit cyclic rotation of the cams 47 when the motor 44 is energized. As rotation of the cams 47 is initiated through the mechanism just described, the cam follower rollers 36 are moved upwardly against the action of the compression springs 41 to release the action of the gripping means 30 upon the tier of units. Simultaneously with the release of the gripping action upon the tier of units, rotation is imparted to the rollers 42 to carry the tier of masonry units from the tilting machine to a series of parallelly disposed conveyor rollers 50 which are journalled for free rotation in a frame 51 forming a part of a discharge conveyor.

Referring more particularly to the schematic electrical diagram shown in Fig. 6 it will be noted that L1 and L2 represent the power lines. One side of a selector switch 60 is connected to the line L1 and the other side connected to the frame tilting motor 16 with the other side of the motor 16 connected to the power line L2. It will thus be noted that when the manually operable selector switch 60 is closed the motor 16 will be running idly. A plurality of normally open control switches 61 which are adjustably arranged between the rollers 12 of the tiltably mounted frame member 13 in a manner so that each will be selectively closed by the proper location of a masonry unit on the rollers 12. The several normally open switches 61 are connected in series so that the control circuit for energizing a clutch 62 effective to establish a driving connection between the motor 16 and the mechanism for tilting the frame 13 will not be closed until the selected number of masonry units have been properly deposited upon the frame member 13. One side of the first normally open control switch 61 is connected to the power line L1 while the other side of the last normally open series connected switches 61 leads to one side of the clutch 62. The other side of the clutch 62 is connected to the power line L2 through a pair of normally closed contacts of a switch 63 so that the idly operating motor 16 will be drivingly connected with the frame operating mechanism to rock the same about the pivot pins 15 when the proper number of masonry units are in position upon the frame member. When the frame member has been rocked to a substantially vertical position wherein the masonry blocks originally disposed in rows on the frame member 13 have been translated into tiers, a suitable limit switch is contacted to effect the breaking of the normally closed contacts of the switch 63 and the establishment of an electrical connection between a normally open pair of contacts in the switch 63. One of these normally open contacts is electrically connected to the line L1 and the other to one side of the electric motor 44 which serves as a means for releasing the gripping means 30 from engagement with the stack of units and affords the driving medium for the rollers 42 to effect the discharge of the tier of units from the tilting machine. The other side of the motor 44 is connected through a pair of normally closed contacts of a switch 64 to the power line L2 so that the motor 44 is energized immediately upon the automatic actuation of the switch 63 to close its normally open contacts. Upon release of the gripping means 30 through the operation of the cams 47 and the initiating of the discharge movement of the tier of units under the action of the rollers 52, the switch 63 is automatically returned to its normally open position and the switch 64 moves to a position in which a pair of normally open contacts are closed. One of the normally open contacts is connected to the power line L1 and the other contact is connected to the lead of the clutch 62 between the clutch and the last of the series of normally open switches 61. Upon the actuation of the switch 64 to its last mentioned position, it will be noted that the clutch 62 is re-energized by power from the line L1 through the last closed contacts of the swtich 64 and the normally closed contacts of the switch 63 which in turn is connected to the power line L2. When the rockably mounted frame member has been returned to its normally horizontal position, suitable means are contacted to break the last mentioned circuit and reestablish a bridging contact between the normally closed contacts of the switch 64 to prepare the circuit for the next cycle of operation.

A brief description of a complete cycle of operation of the machine will serve to emphasize both its simplicity and effectiveness in producing the desired results.

Properly formed masonry units are delivered onto the rollers 12 of the frame member 13 preferably in rows wherein the air passages through the units are disposed in the vertical position which they had when the units were orignally formed. In instances where the conventional concrete foundation or building block is being handled, the frame member 13 is adapted to receive and accommodate four rows of six blocks each. In this particular instance a total of twenty-four normally open switches 61 are positioned on the frame member 13 between pairs of adjacent rollers 12 in a manner such that each of the several switches 61 are adapted to be closed by the weight of an individual block normally supported by the rollers 12 but adapted to effect the automatic closing of each individual switch by its presence.

When it is desired to effect the automatic operation of the tilting machine, the selector switch 60 is manually closed to place the motor 16 in continuous operation. As the building blocks are fed onto the rollers 12 of the frame 13 in any appropriate manner from the delivery conveyor 27 they move forwardly until the first block of each of the four rows engages the end rail 28 of the frame member 13. The succeeding blocks are moved forwardly until such time as the predetermined capacity of the machine is satisfied. With the proper positioning of the last block or series of blocks each of the normally open series arranged control switches 61 will have been closed and when the last of such switches is closed, the clutch 62 is energized to effect the transmission of power to rotate the cams 18 to thereby effect the rocking movement of the frame member 13 from its horizontal loading position to a vertical discharging position wherein the series of rows of blocks have been translated into a stack containing a plurality of tiers. As the frame 13 approaches its vertical position, it engages and actuates any suitable means for effecting the operation of the switch 63 to disconnect the clutch 62 and simultaneously effect the energization of the motor 44 which in turn transmits power through suitable driving connections with the cams 47 to effect the disengagement of the gripping means 30 from contact with the blocks and simultaneously initiate rotation of the conveyor rollers 42 to move the stack of blocks from the tilting machine to discharge conveyor rollers 50. After the gripping action of the means 30 has been released from the stack of blocks and the stack moved to the conveyor rollers 50, suitable means is automatically actuated to effect the shifting of the position of both of the switches 63 and 64 to effect the re-energization of the clutch 62 to re-establish the driving connection between the motor 16 and the frame member 13 to return the latter to its normal horizontal loading position. As the frame 13 reaches its loading position, suitable means is actuated to return the switch 64 to its normally required closed position to prepare the circuit of the motor 44 for its next successive operation.

From the foregoing detailed description of an illustrative embodiment of the present invention, it will be noted that a simple and effective machine has been provided which is adapted in operation to facilitate the handling of masonry units during their production to eliminate the previous requirement of expensive time-consuming manual labor.

The automatic transferring of the position of the air passages in the blocks from their normal vertical positioning to that of a horizontal positioning makes it possible to expedite the curing of the blocks or stacking or cubing of the blocks for storage purposes by reason of the fact that the cubing of the blocks may now be expeditiously effected by the use of forked lift trucks so that the tiers of blocks may be stacked one upon the other without requiring the manual handling of any of the blocks.

While the invention has been described in considerable detail in the foregoing specification, it is to be understood that various changes may be made in its embodiment without departing from or sacrificing any of the advantages hereinafter claimed.

I claim:

1. The combination in a masonry unit handling machine including a delivery conveyor and a discharge conveyor of a tilting mechanism for changing during the course of its handling the position and arrangement of masonry units each formed with a normally vertically disposed air passage, said tilting mechanism comprising a base, a frame rockably mounted on said base, a conveyor on said frame for receiving and supporting a plurality of rows of units delivered thereto from said delivery conveyor with the air passages in vertical position, operating means for rocking said frame, conveyor and supported rows of units to transfer the support of each of said units from one of its surfaces to another whereby said units are deposited on said discharge conveyor in tiers having the air passage in each of said units in a horizontal position to facilitate the subsequent handling of said units, gripping means movable in response to the rocking movement of said tilting mechanism to releasably retain said units in position on said tilting mechanism, and cam means operative on said gripping means when said units are deposited in a tier on said discharge conveyor to release the gripping action whereby said tilting mechanism is unloaded in vertical position and then returned to its horizontal loading position.

2. The combination in a masonry handling machine including a delivery conveyor and a discharge conveyor of a tilting mechanism for changing during the course of its handling the position and arrangement of the masonry units each formed with a normally vertically disposed air passage, said tilting mechanism comprising a base, a frame pivotally mounted adjacent one of its ends to said base, a conveyor on said frame for receiving and supporting a plurality of rows of masonry units delivered thereto from said delivery conveyor with the air passages in vertical position, hinged linkage connecting said frame and said base, a cam follower on said linkage, cam means operative on said follower to tilt said frame, conveyor and supported rows of masonry units from a horizontal to a vertical position wherein said masonry units are deposited on said discharge conveyor in tiers having the air passage in each of said units disposed in a horizontal position to facilitate subsequent handling of said units, gripping means slidably mounted on said frame, said gripping means being movable in response to the tilting movement of said tilting mechanism to frictionally engage the adjacent row of units to releasably retain all of the units in position on said tilting mechanism during its movement from horizontal to vertical position, and cam means engageable with said gripping means when said units are deposited in tiers on said discharge conveyor to release the gripping means from engagement with said masonry units.

3. The combination in a masonry handling machine including a delivery conveyor and a discharge conveyor of a tilting mechanism for changing during the course of its handling the position and arrangement of masonry units each formed with a normally vertically disposed air passage, said tilting mechanism comprising a base, a frame pivotally mounted adjacent one of its ends to said frame, a conveyor on said frame for receiving and supporting a plurality of rows of masonry units delivered thereto from said delivery conveyor with the air passages in vertical position, hinged linkage connecting said frame and said base, a cam follower on said linkage, a driven cam operatively associated with said cam follower, said linkage being responsive to rotation of said cam to rock said tilting mechanism from a horizontal to a vertical position whereby said masonry units are on said discharge conveyor in tiers with the air passage in each of said units disposed in horizontal position to facilitate subsequent handling of said units, spring urged gripping means slidably mounted on said frame, means for normally retaining said gripping means out of contact with said rows of units, said gripping means being responsive to the tilting movement of said tilting mechanism to frictionally engage the adjacent row of said units to releasably retain all of the units in position on said tilting mechanism during its movement from horizontal to vertical position, and driven cam means engageable with said spring urged gripping means when the same is in its vertical position with said units deposited in tiers on said discharge conveyor to release its gripping action on said masonry units.

References Cited in the file of this patent

UNITED STATES PATENTS

| | | |
|---|---|---|
| 1,694,586 | Dyhrberg | Dec. 11, 1928 |
| 1,870,207 | Washburne | Aug. 2, 1932 |
| 2,038,758 | Paxton | Apr. 28, 1936 |
| 2,508,698 | Von Beren | May 23, 1950 |